(12) United States Patent
Ogura

(10) Patent No.: US 6,184,933 B1
(45) Date of Patent: *Feb. 6, 2001

(54) IMAGE PICKUP APPARATUS WHEREIN PLURAL ELEMENTS SIMULTANEOUSLY PICK UP THE IMAGE AND THE STATE OF THE INCIDENT

(75) Inventor: Shigeo Ogura, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/978,009

(22) Filed: Nov. 25, 1997

Related U.S. Application Data

(63) Continuation of application No. 08/520,742, filed on Aug. 29, 1995, now abandoned.

(30) Foreign Application Priority Data

Sep. 2, 1994 (JP) .................................................. 6-209950

(51) Int. Cl.⁷ ............................ G03B 13/00; H04N 5/238
(52) U.S. Cl. ......................... 348/364; 348/280; 348/296; 348/312; 348/347; 396/96
(58) Field of Search ..................................... 348/207, 222, 348/224, 228, 229, 230, 234, 237, 238, 262, 265, 337, 340, 345, 349, 350, 354, 355, 362, 364, 266, 273, 272, 280, 294, 296, 311, 312; 396/89, 96, 100, 102, 103, 104; H04N 5/235, 5/225, 5/232, 5/238

(56) References Cited

U.S. PATENT DOCUMENTS

| | | | | |
|---|---|---|---|---|
| 4,599,640 | * | 7/1986 | Dischert | 348/265 |
| 4,599,653 | * | 7/1986 | Kimura | 348/349 |
| 4,843,474 | * | 6/1989 | Suzuki | 358/213.19 |
| 5,081,535 | * | 1/1992 | Kondo et al. | 348/230 |
| 5,307,158 | * | 4/1994 | Tsuruta et al. | 348/265 |
| 5,363,137 | | 11/1994 | Suga et al. | 348/302 |
| 5,379,069 | * | 1/1995 | Tani | 348/333 |
| 5,418,564 | * | 5/1995 | Aoki et al. | 348/264 |
| 5,436,660 | * | 7/1995 | Sakamoto | 348/207 |
| 5,515,132 | * | 5/1996 | Iwasaki | 354/432 |
| 5,526,048 | * | 6/1996 | Yamamoto | 348/223 |
| 5,589,880 | * | 12/1996 | Tsukui | 348/229 |
| 5,619,260 | * | 4/1997 | Miyadera | 348/223 |
| 5,914,755 | * | 6/1999 | Ito et al. | 348/552 |

FOREIGN PATENT DOCUMENTS

| | | | |
|---|---|---|---|
| 4-3670 | 1/1992 | (JP) | H04N/5/335 |
| 4-212577 | 8/1992 | (JP) | H04N/5/335 |

OTHER PUBLICATIONS

Yoshihiro Fujita, et al., "An HDTV 2/3–inch CCD Hand–held Camera Employing Dual–green Spacially Offset Image Pickup Method," J. Telev. Soc., vol. 47, No. 2, 1993 (with English Abstract).

* cited by examiner

Primary Examiner—Wendy Garber
Assistant Examiner—Ngoc-Yen Vu
(74) Attorney, Agent, or Firm—Fitzpatrick, Cella, Harper & Scinto

(57) ABSTRACT

An image pickup apparatus wherein plural elements simultaneously pick up the image and the state of the incident light includes a plurality of image pickup elements for generating an object image signal on the basis of a signal output from at least one of the plurality of image pickup elements, and for generating an incident light state signal on the basis of a signal from another image pickup element having substantially the same photographing region as a photographing region of said at least one image pickup element which generates the object image signal. A read-out period for one frame of said at least one image pickup element which generates the object image signal being different from the read-out period for one frame of said another image pickup signal which generates the incident light state signal.

10 Claims, 4 Drawing Sheets

IMAGE PICKUP APPARATUS WHEREIN PLURAL ELEMENTS SIMULTANEOUSLY PICK UP THE IMAGE AND THE STATE OF THE INCIDENT

This application is a continuation of application Ser. No. 08/520,742, filed Aug. 29, 1995, now abandoned.

BACKGROUND OF THE INVENTION

1. Field of the Invention

The present invention relates to image pickup apparatus and, more particularly, to an apparatus which is suitably used in a so-called multi-element image pickup device which picks up an object image using a plurality of image pickup elements.

2. Related Background Art

A conventional video camera reproduces a picked-up image on a television screen. For this reason, the recording rate of the video camera is determined to be a predetermined value. For example, in the case of the NTSC system, 60 fields (frames) of images are recorded per second. More specifically, an exposure is performed in 1/60 sec, and an image signal is read out and recorded in the next 1/60 sec.

On the other hand, upon detection of the state of incident light for auto-focus (to be abbreviated as AF hereinafter) control, auto-exposure (to be abbreviated as AE hereinafter) control, and the like, a signal for a photographing operation is read out, and thereafter, required data is fed back from this signal to control the iris and the lens driving operation.

For example, photometry for the AE control is performed based on a signal obtained by averaging, by an integrator, a plurality of frames of (three to four frames) of signals, which are output from an image pickup element and are amplified by an amplifier. On the other hand, in the AF control, a high-frequency component of a signal of each field is extracted, and the lens is controlled to maximize the extracted component.

Japanese Laid-Open Patent Application No. 4-212577 discloses a technique for performing two or more AF scans per field period by setting the read-out range in the vertical direction to be a portion of a photographing screen including a distance measurement frame.

As described above, the video camera can control the iris and lens only after a signal exposed in one field period (1/60 sec) is read out for one field period. For this reason, since the video camera cannot quickly respond to an abrupt movement of an object or an abrupt change in brightness, the photographed image often becomes too dark or bright.

For the same reason as above, the focal point cannot often be adjusted to an object which moves abruptly. When a photographing light beam is split by, e.g., a prism, and is received by AE and AF sensors different from the image pickup element, the amount of light guided to the image pickup element for a photographing operation decreases, resulting in deterioration of image quality and an increase in cost.

In the technique proposed by Japanese Laid-Open Patent Application No. 4-212577, since a signal read out from the image pickup element corresponds to a portion of the screen, the signal cannot be used in a photographing operation. Therefore, in this case, since a photographing operation is started after the end of the AF operation, an image to be photographed cannot be confirmed during the AF operation, and the time required until the photographing operation is started is long, resulting in a large time lag.

SUMMARY OF THE INVENTION

The present invention has been made in consideration of the above-mentioned problems, and has as its object to provide an image pickup device which can simultaneously perform an image pickup operation of an object image and detection of the state of incident light.

It is another object of the present invention to provide an image pickup device which can prevent an image in a finder from being interrupted during a photographing operation.

An image pickup device according to an embodiment of the present invention has a plurality of image pickup elements. An object image signal is generated on the basis of a signal output from at least one of these image pickup elements, and the state of incident light is detected on the basis of a signal from another image pickup element having substantially the same photographing region as that of the image pickup element used for generating the object image.

As another feature of the present invention, the image pickup element for generating the object image has an exposure amount different from the image pickup element used for detecting the state of incident light.

As still another feature of the present invention, the read-out time or read-out interval (or cycle) per frame of the image pickup element for generating the object image is different from that of the image pickup element used for detecting the state of incident light.

As still another feature of the present invention, the effective read-out range of the image pickup element for generating the object image is different from that of the image pickup element used for detecting the state of incident light.

As still another feature of the present invention, the image pickup device has a plurality of image pickup elements, and has a first mode for detecting the state of incident light on the basis of a signal from at least one of these image pickup elements, and a second mode for photographing an object image using at least two of the plurality of image pickup elements.

As still another feature of the present invention, the first and second modes are selected by single operation means.

Since the embodiment of the present invention has the above-mentioned technical means, generation of an object image and detection of the state of incident light can be simultaneously performed. Therefore, the state of incident light can be detected at the position and time of an image to be photographed which are independent from the read-out state of the image to be photographed such as the read-out range, read-out time or read out interval (or cycle) recording rate, and the like of the image to be photographed while photographing an image or while confirming an object as a finder image.

According to other features of the present invention, since the device has the first mode for detecting the state of incident light on the basis of a signal from at least one image pickup element and the second mode for photographing an object image using at least two image pickup elements, a case wherein the AE control, AF control, and the like are performed at high speed, a case wherein the recording capacity is to be reduced, and a case wherein an image is to be photographed with higher image quality can be desirably selected. In addition, the time lag upon switching from the first mode to the second mode can be reduced.

The above and other features and objects of the present invention will become apparent from the following description taken in conjunction with the accompanying drawings.

DETAILED DESCRIPTION OF THE PREFERRED EMBODIMENTS

An image pickup device according to an embodiment of the present invention will be described below with reference to the accompanying drawings.

Figure 1:
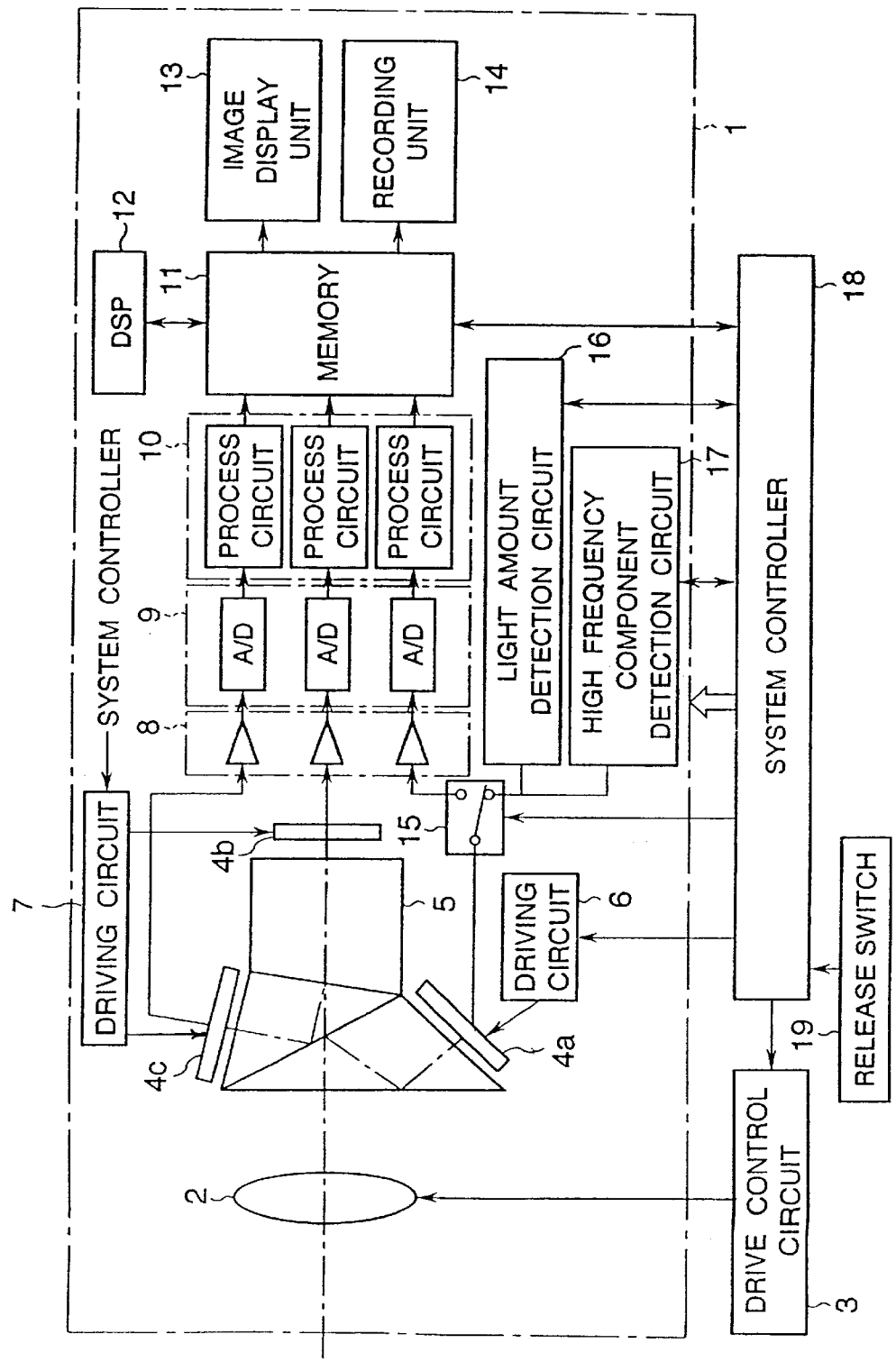
FIG. 1 is a block diagram of an image pickup device according to the first embodiment of the present invention.

FIG. 1 is a block diagram which best illustrates the features of the first embodiment of an image pickup device according to the present invention.

Referring to FIG. 1, an image pickup unit 1 of a camera comprises a photographing optical system 2 which includes an iris, a zooming lens, a focusing lens, and the like. The photographing optical system 2 is driven by a drive control circuit 3. First, second, and third image pickup elements 4a, 4b, and 4c are arranged around the photographing optical system 2.

The image pickup unit 1 also comprises a prism 5 for splitting an object image toward the first to third image pickup elements 4a to 4c, a first driving circuit 6 for driving the first image pickup element 4a, a second driving circuit 7 for driving the second and third image pickup elements 4b and 4c, amplifiers 8, A/D converters 9, process circuits 10, and a memory 11.

The image pickup unit 1 further comprises a digital signal processor (DSP) 12, an image display unit 13, a recording unit 14, a switch 15, a light amount detection circuit 16, and a high-frequency component detection circuit 17. The image pickup unit 1 is connected to a system controller 18 to which a release switch 19 is connected.

In the image pickup device of this embodiment with the above arrangement, an optical image from an object is incident into the prism 5 via the photographing optical system 2. The optical image is split by the prism 5, and the split images are imaged on the image pickup elements 4a, 4b, and 4c.

Red (R), blue (B), and green (G) filters are respectively adhered to these image pickup elements 4a, 4b, and 4c. In this embodiment, the image pickup elements 4b and 4c are driven by the single driving circuit 7.

One of a state wherein a signal output from the first image pickup element 4a, which is driven by the first driving circuit 6, is output to the light amount detection circuit 16 and the high-frequency component detection circuit 17 (to be referred to as state 1 hereinafter) and a state wherein the signal from element 4a is output to the memory 11 via the amplifier 8, the A/D converter 9, and the process circuit 10 (to be referred to as state 2 hereinafter) is selected depending on the state of the switch 15. The state of the switch 15 is controlled by a signal output from the system controller 18.

When state 1 is selected, an R signal from the first image pickup element 4a is input to the system controller 18 via the light amount detection circuit 16 and the high-frequency component detection circuit 17. The light amount detection circuit 16 outputs a signal obtained by integrating the light amount of an object image with respect to a signal read out from the first image pickup element 4a for a predetermined period of time. The high-frequency component detection circuit 17 detects a high-frequency component from the signal read out from the first image pickup element 4a. Based on these signals, the system controller 18 drives the photographing optical system 2 via the drive control circuit 3, thus attaining AE control and AF control.

On the other hand, G and B signals from the second and third image pickup elements 4b and 4c are output to the memory 11 via the amplifiers 8, the A/D converters 9, and the process circuits 10.

Since data stored in the memory 11 do not include a red (R) signal, only the G signal, for example, is converted into, e.g., an NTSC monochrome video signal by the digital signal processor 12, and is recorded or displayed on a monitor.

When state 2 is selected, the R, G, and B signals from the three image pickup elements 4a, 4b, and 4c are output to the memory 11 via the amplifiers 8, the A/D converters 9, and the process circuits 10.

Data stored in the memory 11 are converted into a signal format such as NTSC video signals, which corresponds to the format of the image display unit 13 or the recording unit 14, and the converted signals are recorded or displayed on the monitor.

The data stored in the memory 11 are input to the above-mentioned light amount detection circuit 16 and high-frequency component detection circuit 17 via the system controller 18 to perform AE control and AF control.

Figure 2:
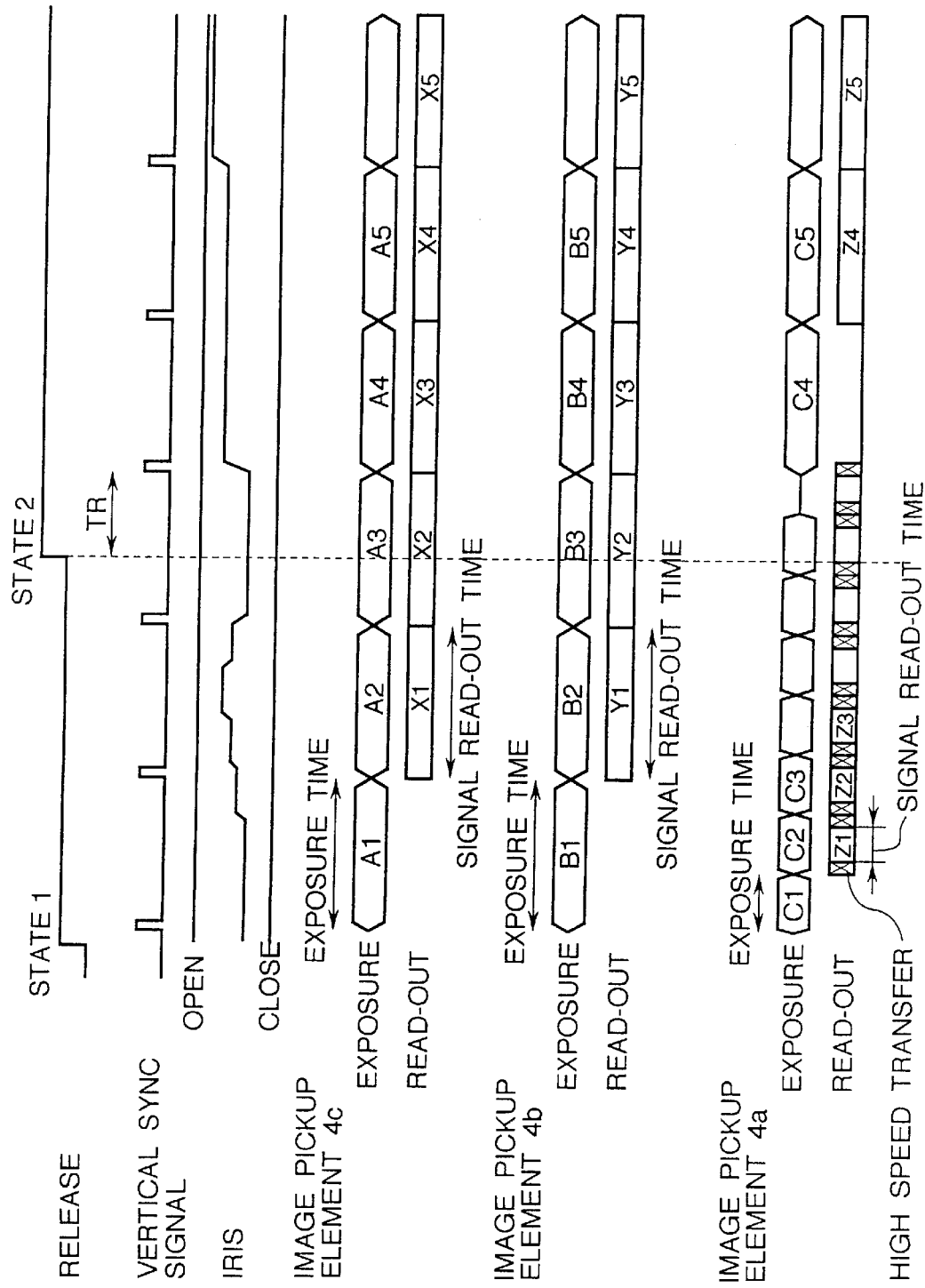
FIG. 2 is a timing chart for explaining the operation of the image pickup device according to the first embodiment of the present invention.

FIG. 2 is a timing chart of the photographing operation of this embodiment. The photographing operation will be explained below. The release switch 19 changes between states 1 and 2 described above depending on the stroke position of a release button (not shown).

When the release switch 19 is depressed and state 1 is detected, exposure of the image pickup elements 4a, 4b, and 4c is started in synchronism with the timing of a vertical sync signal. During state 1, the second and third image pickup elements 4b and 4c repeat exposure and read-out operations in synchronism with the vertical sync signal.

More specifically, in the case of an NTSC video signal, exposure is performed for a one-field period (1/60 sec), and a signal is read out for the next one-field period. The readout signal, e.g., the G signal from the image pickup element 4b, which is suitable for a luminance signal in the NTSC video signal, is displayed on the image display unit 13 as a monochrome reproduced image, which is utilized as, e.g., a finder image. Upon recording, since image data for one image pickup element is recorded, the recording capacity can be reduced as compared to image data for the three image pickup elements (to be described later).

Referring to FIG. 2, signals A1 and A2 exposed by the third image pickup element 4c are respectively read out as signals X1 and X2. Similarly, signals B1 and B2 exposed by the second image pickup element 4b are respectively read out as signals Y1 and Y2.

In the NTSC video signal, odd and even fields are alternately read out in units of fields. In state 1, a signal exposed on the first image pickup element 4a is exposed for a predetermined exposure time by a read-out method (to be described later), and the predetermined range of a frame is read out at high speed.

In FIG. 2, signals C1, C2, and C3 are respectively read out as signals Z1, Z2, and Z3.

The readout signals Z1, Z2, and Z3 are supplied to the system controller 18 via the light amount detection circuit 16 and the high-frequency component detection circuit 17, and the system controller 18 performs AE control and AF control, thus driving the iris and the focusing lens.

More specifically, in order to obtain high AE and AF control speeds, the feedback time is shortened by shortening the exposure times of the signals C1, C2, and C3.

On the other hand, in order to attain AE control and AF control with high precision, the exposure times of the signals C1, C2, and C3 may be prolonged to increase their exposure amounts, thus improving the S/N ratio of the signals.

When the release switch 19 is further depressed and state 2 is detected, a photographing operation is performed using all the signals exposed by the three image pickup elements 4a, 4b, and 4c as an NTSC color video signal.

At this time, since state 1 can be switched to state 2 depending on the stroke position of the single release switch 19, an operator can perform this operation without removing his or her eye from the finder, and can quickly select state 2.

In FIG. 2, after state 1 is switched to state 2, signals A4, B4, and C4 exposed by the third, second, and first image pickup elements 4c, 4b, and 4a are respectively read out as signals X4, Y4, and Z4, and signals A5, B5, and C5 are respectively read out as X5, Y5, and Z5. In the mode of state 2, the time lag from when the release switch 19 is depressed to the stroke position for selecting state 2 until the beginning of exposure corresponds to the time required until the next vertical sync signal, i.e., TR in FIG. 2.

Therefore, the photographing operation in state 2 is started after a time lag of a one-field period (1/60 sec) or less. During the switching period from state 1 to state 2, since signals from the image pickup elements 4b and 4c are exposed and read out, a photographed image can be utilized as a finder image without being interrupted.

Since the signals X4, Y4, and Z4 or X5, Y5, and Z5 read out at the same time are respectively R, G, and B signals, an image for a one-field period is formed on the memory 11, and thereafter, is reproduced or recorded.

As described above, in state 2, the signals on the memory 11 are supplied to the light amount detection circuit 16 and the high-frequency component detection circuit 17 via the system controller 18 to attain AE control and AF control.

Figure 3:
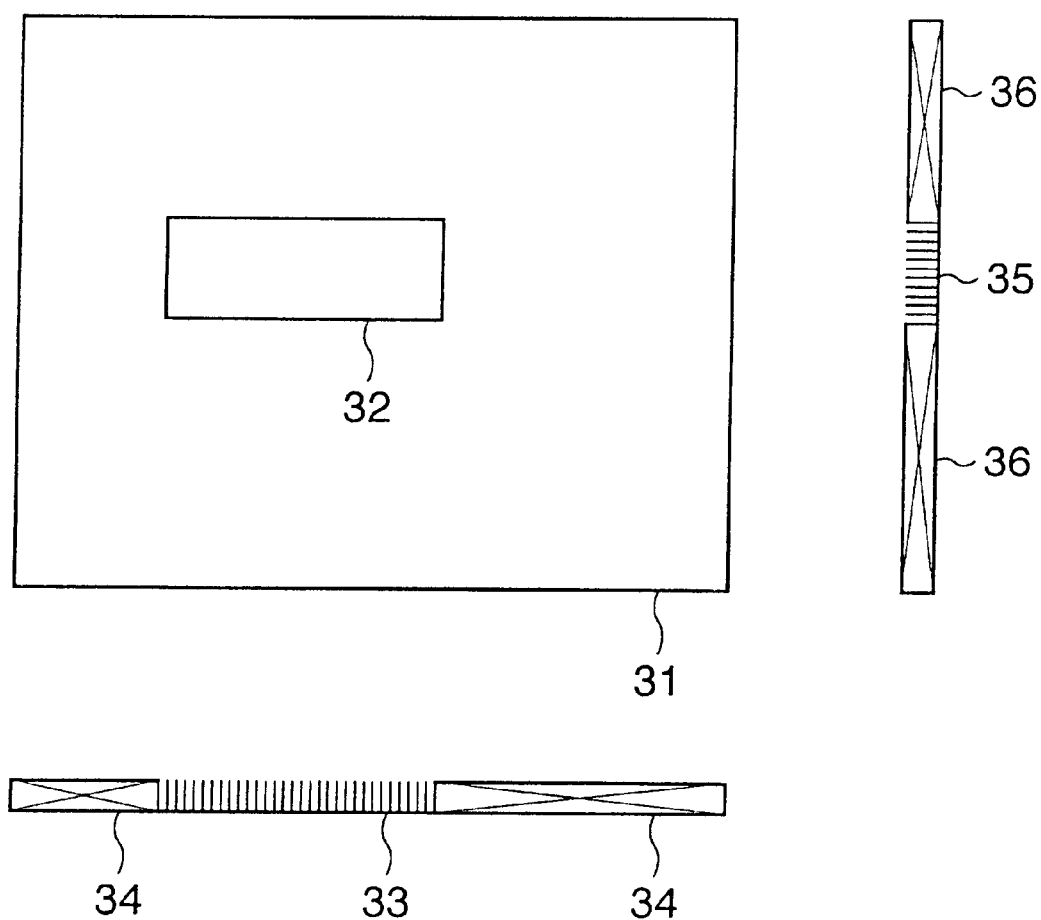
FIG. 3 is an explanatory view of the method of reading out signals from a partial region of an image pickup element.

FIG. 3 shows the signal read-out method of the first image pickup element 4a. Since this method is disclosed in, e.g., Japanese Laid-Open Patent Application No. 4-3670, a brief explanation thereof will be given below. Referring to FIG. 3, a full pixel region 31 represents the maximum photographing field angle of the image pickup element. The region 31 includes an effective read-out range 32 for detecting the state of incident light. FIG. 3 also illustrates a horizontal CCD transfer signal 33, a high-speed transfer portion 34 of the horizontal CCD transfer signal, a vertical CCD transfer signal 35, and a high-speed transfer portion 36 of the vertical CCD transfer signal.

In this case, since a signal from a region other than the effective read-out range 32 of the first image pickup element 4a is not used, high-speed transfer can be realized and the read-out time for one frame can be shortened. More specifically, by changing the range of the high-speed transfer portion, an arbitrary region can be selected as the effective read-out range 32 in the full pixel region 31. As the effective read-out range 32 becomes smaller, the transfer speed becomes higher.

Figure 4:
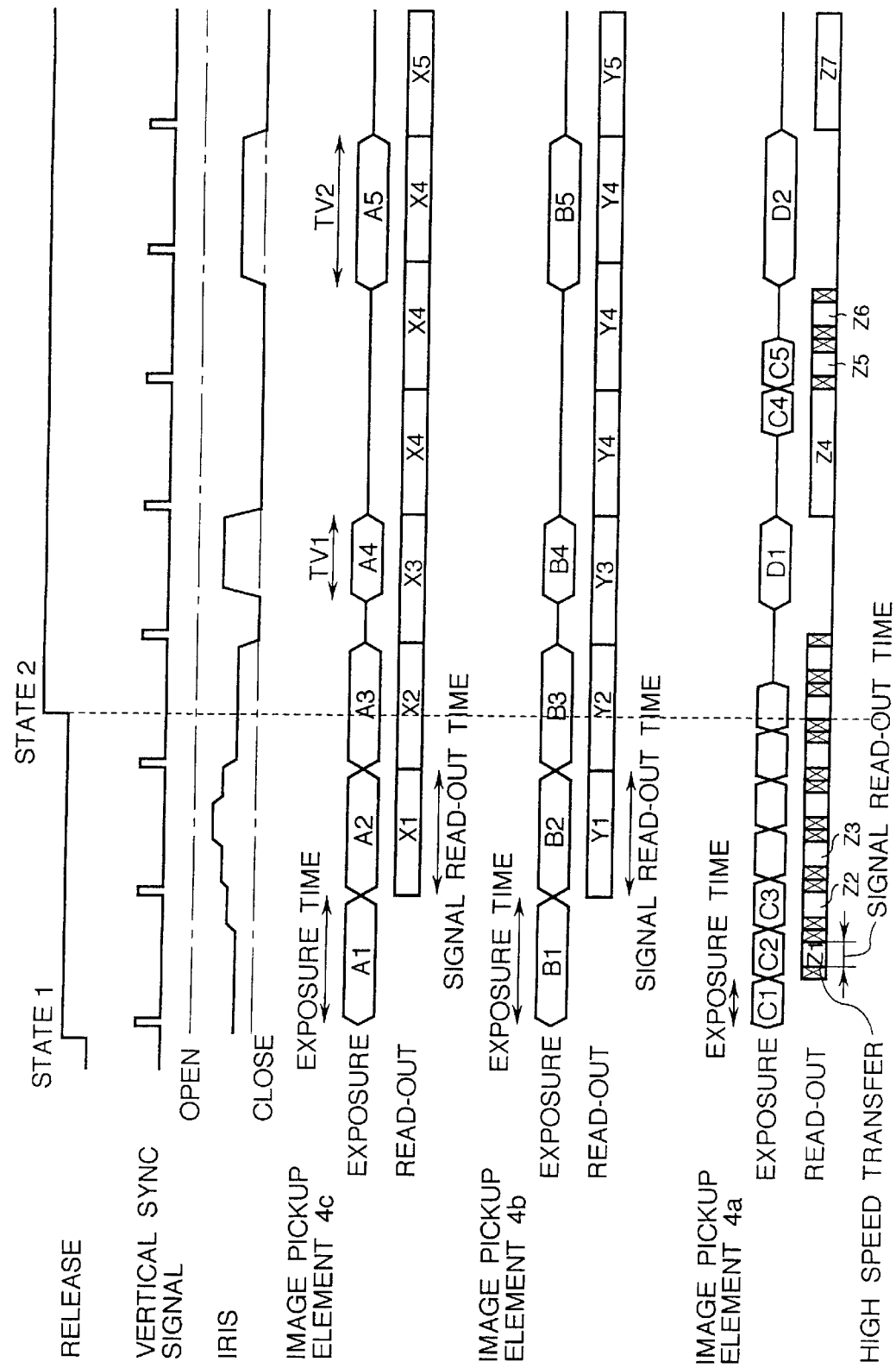
FIG. 4 is a timing chart for explaining the operation of an image pickup device according to the second embodiment of the present invention.

FIG. 4 is a timing chart for explaining the second embodiment of the present invention. In FIG. 4, since state 1 is the same as that in FIG. 2 described above, state 2 will be explained below.

When the release switch 19 is depressed to the deep position, and state 2 is detected, the iris is temporarily closed in synchronism with a horizontal sync signal.

Thereafter, the iris is opened to attain a shutter speed TV1 shown in the upper portion in FIG. 4, and the image pickup elements 4a, 4b, and 4c are exposed. Signals D1, B4, and A4 exposed by the image pickup elements are respectively read out as signals Z4, Y4, and X4.

During the read-out period, the iris is closed to prevent smearing due to noise added during signal transfer, which deteriorates image quality. Since no photographing signal is supplied during this period, the latest readout signal, i.e., signal X4 or Y4 is repetitively read out from the memory 11 to prevent interruption of an image display until a new photographing signal is read out.

The first image pickup element 4a starts exposure in synchronism with the end of the read-out operation of the signal Z4. Since this exposure is performed for AE control and AF control, and signals other than a given region on the image pickup element 4a are transferred at high speed, all pixels can be read out at high speed. More specifically, signals C4 and C5 are read out as signals Z4 and Z5, and after the end of AE and AF operations, the iris begins to open to attain a determined shutter speed TV2. As a result, the image pickup elements 4a, 4b, and 4c are simultaneously exposed again.

In FIG. 4, the time TV2 is longer than the one-field period, so that signals from the image pickup elements are not read out in synchronism with the first vertical sync signal after the beginning of exposure but are read out in synchronism with the next vertical sync signal. More specifically, signals D2, B5, and A5 exposed by the three image pickup elements are read out as signals Z7, Y5, and X5. In this case, the exposure is started after the iris is closed completely. However, the exposure operation may be attained by an electronic shutter using the image pickup elements.

In the above description, since a photographed image signal is recorded or reproduced as an NTSC video signal, odd and even fields are alternately read out in the signal read-out operation from the image pickup elements. Alternatively, all the pixels may be read out and recorded during a one-field period, and an image may be reproduced on an image display such as a multi-scan monitor for a computer, which can sequentially display all the lines.

Table 1 below summarizes the number of image pickup elements and their color filter arrangements.

TABLE 1

| | | Color Filter | State 1 | State 2 |
|---|---|---|---|---|
| (1) | 3-element Type | G | For Photographing or Finder | For Photographing |
| | | R | For State Detection | For Photographing |
| | | B | (For State Detection) | For Photographing |
| (2) | 3-element Type | R/B | For Photographing or Finder | For Photographing |
| | | G1 | For Photographing or Finder | For Photographing |
| | | G2 | For State Detection | For Photographing |

TABLE 1-continued

|   |   | Color Filter | State 1 | State 2 |
|---|---|---|---|---|
| (3) | 2-element Type | Complementary Mosaic (M, G, C, Y) | For Photographing or Finder | For Photographing |
|   |   | Complementary Mosaic (M, G, C, Y) | For State Detection | For Photographing |

Note that (1) corresponds to a 3-element type image pickup system which uses three image pickup elements respectively adhered with R (red), G (green), and B (blue) filters, as has been described in the above embodiment. A signal from one of these image pickup elements is used for detecting the state of incident light, and a photographed image is displayed using signals from the remaining image pickup elements.

In this case, since a color image is formed when all the signals from the three image pickup elements are input, in an image display operation in state 1, i.e., upon detection of the state of incident light using one image pickup element, a photographed image is displayed as a monochrome image using signals from other image pickup elements.

Therefore, a signal used for displaying an image at that time is preferably a signal from the image pickup element with the G filter, which is closest to the luminance component. Alternatively, if an importance is to be placed on incident light state detection performance, a signal output from the image pickup element with the G filter may be used for detecting the state of incident light, and an image may be displayed based on a signal from the image pickup element with the R or B filter.

Also, (2) similarly corresponds to a 3-element image pickup system. In this system, G filters are adhered to two image pickup elements, and a filter having R and B stripes is adhered to the last image pickup element. In the image pickup system with this filter arrangement, two out of three image pickup elements (CCDs) adhered to a prism are pixel-displaced from each other to pick up an object image, as described in "High definition television 2/3 Compact CCD Camera Using Dual-green system", Image Information Technology & Broadcast Technique as Journal of Television Society, Vol. 47, No. 2, 1993.

In this case, the state of incident light is detected using a signal of one image pickup element with the G filter, and an image is formed based on signals from the remaining two image pickup elements with G and R/B filers. Thus, a color image can be displayed or reproduced even in state 1.

(3) corresponds to an example of a 2-element image pickup system. In this system, complementary mosaic filters of Y (yellow), M (magenta), C (cyan), and G (green), which are used for a video camera, are adhered to the two image pickup elements. In state 1, a signal from one of the two image pickup elements is used for detecting the state of incident light, and a signal from the other image pickup element is used for a photographing operation.

In this system as well, since a color image can be formed based on a signal from one image pickup element, a color image can be displayed or reproduced in state 1. When the two image pickup elements are pixel-displaced, a high-definition image can be photographed in state 2.

As described above, according to the first embodiment of the present invention, since an object image is generated on the basis of a signal output from at least one of a plurality of image pickup elements, and the state of incident light is detected on the basis of a signal from another image pickup element having substantially the same photographing region as that of the image pickup element used for generating the object image, the photographing operation of the object image and detection of the state of incident light can be simultaneously attained. Thus, while photographing an image or while confirming an object image as a finder image, the state of incident light can be detected at the position and time of an image to be photographed independently of the read-out state of an image to be photographed such as the read-out range, the read-out time or read-out interval (or cycle), and the like with respect to the image to be photographed, and AE control, AF control, and the like of the image to be photographed can be performed on the basis of the detected information.

According to another embodiment, the exposure amount of an image pickup element for generating an object image is set to be different from that of an image pickup element for detecting the state of incident light. For this reason, when high AE and AF control speeds are to be obtained, the exposure time is shortened to shorten the feedback time, and when AE control and AF control are to be performed with higher precision, the exposure time is prolonged to increase the exposure amount, thereby improving the S/N ratio of a signal.

According to still another embodiment, the read-out time or read-out interval (or cycle) for one frame of an image pickup element for generating an object image is set to be different from that of an image pickup element for detecting the state of incident light. For this reason, by shortening the read-out time or the read-out interval, information for AE control, AF control, and the like can be fed back at high speed.

According to still another embodiment, the effective read-out range of an image pickup element for generating an object image is set to be different from that of an image pickup element for detecting the state of incident light. For this reason, by widening the effective read-out range of the image pickup element for detecting the state of incident light, the exposure amount can be increased, thereby improving the S/N ratio of a signal used in detection of the state of incident light.

According to still another embodiment, an image pickup device has a plurality of image pickup elements, and has a first mode for detecting the state of incident light on the basis of a signal from at least one of these image pickup elements, and a second mode for photographing an object image using at least two of the plurality of image pickup elements. For this reason, a case wherein AE control, AF control, and the like are to be performed at higher speed, a case wherein the recording capacity is to be reduced, and a case wherein an image is to be photographed with higher image quality can be freely selected, and the time lag required upon switching from the first mode to the second mode can be reduced. Thus, a finder image can be prevented from being interrupted.

According to still another embodiment, since the selection operation between the first and second modes is attained by single operation means, the operability of the camera can be improved.

What is claimed is:

1. An image pickup device comprising:
   a plurality of image pickup elements for generating an object image signal on the basis of a signal output from at least one of said plurality of image pickup elements, and for generating an incident light state signal on the basis of a signal from another image pickup element; and a readout cycle of said at least one image pickup element being different from a readout cycle of said another image pickup element while said object image is supplied to a viewfinder, wherein said device has a first mode for generating the object image signal using a part of said plurality of image pickup elements and for generating the incident light state signal on the basis of a signal from the rest of said plurality of image pickup elements, and a second mode for generating the object image signal using all of said plurality of image pickup elements.

2. A device according to claim 1, wherein an exposure amount of said at least one image pickup element which generates the object image signal is set to be different from an exposure amount of said another image pickup element which generates the incident light state signal.

3. A device according to claim 1, wherein an effective read-out range of said at least one image pickup element which generates the object image signal is different from an effective read-out range of said another image pickup element which generates the incident light state signal.

4. A device according to claim 1, further comprising operation means for selecting the first and second modes.

5. A device according to claim 1, wherein the object image supplied to the viewfinder comprises a monochrome image.

6. A device according to claim 1, wherein the plurality of image pickup elements comprise a Red element, a Blue element, and a Green element, and wherein the readout cycle of the Red image element is different from the readout cycle of the Blue and Green image elements when the object image is supplied to the viewfinder.

7. A device according to claim 1, further comprising a switch for selectively supplying an output of said at least one image pickup element to either automatic exposure processing circuitry or to imaging processing circuitry.

8. A device according to claim 1, wherein, when the readout cycle of the at least one image pickup element is different from the readout cycle of the another image pickup element, the output of said at least one image pickup element is supplied to automatic exposure processing circuitry at the same time that the output of said another image pickup element is supplied to image processing circuitry.

9. A device according to claim 1, wherein the readout cycle of said at least one image pickup element is changed between (i) a first readout cycle when an output from said at least one image pickup element is provided to image processing circuitry, and (ii) a second, different, readout cycle when the output of said at least one image pickup element is provided to circuitry other than the image processing circuitry.

10. A device according to claim 1, wherein the readout cycle of said at least one image pickup element is made to be different from the readout cycle of said another image pickup element by changing an effective readout range of said at least one image pickup element.

* * * * *